United States Patent [19]

Ferguson et al.

[11] 3,912,814

[45] Oct. 14, 1975

[54] FUNGICIDE COMPOSITIONS CONTAINING 2,4-DICHLORO-6-O-CHLOROANILINO-S-TRIAZINE

[75] Inventors: Fred Eugene Ferguson; Robert J. Bell, both of Marysville, Ohio

[73] Assignee: O. M. Scott and Sons Company, Marysville, Ohio

[22] Filed: June 3, 1974

[21] Appl. No.: 475,882

Related U.S. Application Data

[63] Continuation of Ser. No. 299,950, Oct. 24, 1972, abandoned.

[52] U.S. Cl. ................................. 424/249; 424/341
[51] Int. Cl.²... A01N 9/00; A01N 9/22; A01N 9/24
[58] Field of Search ............................ 424/249, 341

[56] References Cited
UNITED STATES PATENTS 2,720,480  12/1955  Wolf ................................ 424/27 X
3,075,878   1/1963  Ziffer .............................. 424/177 X

OTHER PUBLICATIONS

Gregory "Uses & Applications of Chemicals & Related Materials" pp. 275–276 (1939).
Chemical Abstracts 61:16715a (1964).
Chemical Abstracts 73:59308s (1970).
Chemical Abstracts 61:6301g (1964).

Primary Examiner—Albert T. Meyers
Assistant Examiner—Leonard Schenkman
Attorney, Agent, or Firm—J. B. Raden; H. J. Holt

[57] ABSTRACT

A fungicide composition particularly effective for the control of leafspot comprising a mixture of (a) from 1,100 to 1,200 grams of 2,4-dichloro-6-o-chloroanilino-s-triazine, (b) from 50 to 900 mililiters of a sticking agent such as hexylene glycol, (c) from 700 to 2,000 mililiters of octyl phenoxy polyethoxy ethanol and (d) a particulate carrier.

15 Claims, No Drawings

FUNGICIDE COMPOSITIONS CONTAINING 2,4-DICHLORO-6-O-CHLOROANILINO-S-TRIAZINE

This is a continuation of application Ser. No. 299,950, filed Oct. 24, 1972, and now abandoned.

This invention relates to a fungicide composition and to a process of treating plants with the fungicide to control the formation of disease therein.

Fungicides effective for the control of leafspot on plants are known. However, they are generally based on mercury containing compounds, such as phenyl mercuric acetate, and the use of these compounds is being significantly reduced by governmental regulations.

The triazine compound — 2,4-dichloro-6-o-chloroanilino-s-triazine — commonly referred to by its trademark Dyrene, has been known for a number of years as a foliage fungicide, useful for the control of a variety of plant diseases including leafspot. However, leafspot has proven to be a particularly difficult fungus to control and the triazine fungicide has not been entirely satisfactory for control of this fungus at an economic level in granular form. For a number of reasons, it is desirable to use a fungicide in granular form.

It is accordingly a principal object of this invention to provide a triazine fungicide composition which may be effectively used in granular form.

It is an additional object of the present invention to provide a fungicide formulation containing a triazine which effectively controls a variety of fungi including leafspot in plants.

It is still an additional object of this invention to provide a triazine fungicide which has a greater effectiveness than known granular formulations in the control of plant disease at lower application rates.

The foregoing and other objects of the invention are achieved by the use in combination with the triazine and a carrier, of a non-ionic surfactant, namely octyl phenoxy polyethoxy ethanol, and a sticking agent. The preferred nonionic surfactant, commonly referred to by its trademark Triton X-100, has been previously used as an emulsifying agent for insecticides and herbicides. However, the unusual effectiveness of the triazine fungicide in combination with this surfactant, particularly in the control of leafspot, is believed totally unpredictable from a knowledge of the properties or results previously known or achieved with either the fungicide or the surfactant.

In its preferred form, the fungicide compositions of the invention comprise a mixture of the following ingredients in the following proportions:

a. from 1100 to 1200 grams of 2,4-dichloro-6-o-chloroanilino-s-triazine as the active fungicidal ingredient,
b. from 50 to 900 mililiters of a sticking agent, preferably a lower aliphatic glycol,
c. from 700 to 2000 mililiters of octyl phenoxy polyethoxy ethanol, and
d. a particulate carrier.

The proportions are based upon the weight of fungicide normally used to treat 10,000 sq. ft. of turf or plant area. Other amounts of triazine would, of course, require proportionately more or less of the other ingredients. The glycol and surfactant are liquids and thus are expressed in terms of volume rather than weight. Preferred amounts are 100 to 700 ml. (for each 10,000 sq. ft. of turf area) of the glycol sticking agent and 900 to 1,500 ml. of the surfactant, with their combined amounts being preferably between 1,400 and 1,800 ml., or even more preferably 1,600 ml. The carrier may be vermiculate, altapulgite, rice hulls, corn cobs or other known carrier materials in particulate or granular form. It may be used in any amount sufficient to give a flowable composition. Normally, the weight of carrier will be in excess of the weight of fungicide, preferably an amount ranging from 4 to 16 times the amount of triazine.

A particularly effective fungicide composition for the control of leafspot in turf is a composition containing for each 10,000 sq. ft. of turf area 1,419 grams of a commercially available 80% "Dyrene" formulation — that is, 1,135 grams of triazine, 20% inert ingredients — 7,575 to 9,650 grams of vermiculite (about 6½ to 8½ times the amount of triazine), 600 to 800 ml. of hexylene glycol and 800-1000 ml. of Triton X-100 surfactant.

The triazine fungicide 2,4-dichloro-6-o-chloroanilino-s-triazine is a commercially available chemical disclosed more fully in U.S. Pat. No. 2,720,480. The preferred carrier is vermiculite, a highly absorbant micaceous mineral composed of hydrous silicates. The lower aliphatic glycol sticking agents function, as the name suggests, to adher the fungicide to the carrier in order to obtain a homogenious composition. The surfactant is miscible with the lower aliphatic glycols, ie. glycols with from two to six carbons such as ethylene, propylene, diethylene, dipropylene and hexylene glycol.

The surfactant, octyl phenoxy polyethoxy ethanol, is a liquid, anhydrous, non-ionic emulsifying agent sold under the trademark Triton X. The preferred surfactant is that sold specifically under the trademark Triton X-100. The various Triton X surfactants differ in the number of moles of oxyethylene groups. The preferred Triton X surfactants are those that are water-soluble, that is, those normally containing from 7 to as high as 30 oxyethylene groups. Triton X-100 has 9-10 oxyethylene groups, a viscosity of 240 centipoises at 25°C/25°C and a specific gravity of 1.065-average 8.9 lbs. per gallon.

The compositions are prepared by mixing together the glycol sticking agent and surfactant in the proportions indicated. The triazine, normally in an 80% formulation, is fed dry into a blender containing the vermiculite or other carrier while the blender is agitating. Simultaneously, the glycol-surfactant mixture is sprayed onto the solids mixture. The solution mixture may be heated (up to 100°F) to aid in pumping the solution. The compositions of the invention are preferably applied to turf in granular form by, for example, use of a lawn spreader at a setting which will apply a maximum of 22 lbs., but preferably about 10.9 lbs of active triazine per acre of turf. A smaller amount per acre of the composition may, of course, be used depending on the extent of fungus activity and frequency of application.

A number of field tests were run to determine the effectiveness of the formulations of this invention and to compare their effectiveness with similar compositions outside the scope of the invention. The tests were run on a variety of bluegrasses infested with leafspot fungus (*Helminthosporium Vagans*). The tests were set up under standard field test procedures which included the following conditions: 1. plot randomization, 2.

three or more replications, 3. varying locations and 4. various turf varieties.

All tests were run with 2,4-dichloro-6-o-chloroanilino-s-triazine as the fungicide. The remaining ingredients of the formulations were varied and/or omitted to provide comparisons with the formulation of the invention. The following table lists the results of these tests. Where a range of percentages of Disease Control are given, they are the range for a series of test results.

| Fungicide[a] | Carrier | Sticking Agent | Surfactant | % Disease Control |
|---|---|---|---|---|
| 1 Triazine | Vermiculite | Hexylene Glycol | Triton X-100 | 94 – 100% |
| 2 Triazine | Vermiculite | Hexylene Glycol | UltraWet K[b] | 36 – 55% |
| 3 Triazine | Vermiculite | Hexylene Glycol | — | 0 – 80% |
| 4 Triazine | Vermiculite | — | UltraWet K[b] | 52% |
| 5 Triazine | Altapulgite | Hexylene Glycol | — | 50% |
| 6 Triazine | Vermiculite | — | — | 53% |
| 7 Triazine | Vermiculite | Hexylene Glycol | Atplus 109[c] | 27 – 49% |
| 8 Triazine | Vermiculite | Hexylene Glycol | Agrimul N4R[d] | 26 – 74% |
| 9 Triazine | — | — | — | 50% |

[a]In each case, the triazine is 2,4-dichloro-6-o-chloroanilino-s-triazine.
[b]Anionic Surfactant — alkyl benzene sodium sulfonate.
[c]Nonionic Surfactant — polyoxyethylene sorbitan ester.
[d]Anionic Surfactant — aromatic sulfonate — oxide condensate blend.

As these test results clearly indicate, the compositions of the invention consistently showed superior performance for the control of leafspot. Similar tests also demonstrated at least comparable results with dollarspot and snowmold.

In addition to being a highly effective fungicide for leafspot, as well as dollarspot and snowmold, the fungicide composition is also effective against a number of other fungi including rust. It also has proven to have greater activity than other triazine granular formulations at lower rates of application. In granular form, the compositions of the invention have greater activity than other triazine granular formulations at the same application rate and a longer residual effect than other granulars or spray. It has also been found that considerably less dew is formed on grass for periods up to 5 days after application of the granular form of the present compositions — an important advantage since dew is conducive to the growth and spread of fungi.

I claim:

1. A fungicidal composition in granular form comprisong a mixture of
   a. from 1,100 to 1,200 grams of 2,4-dichloro-6-o-chloroanilino-s-triazine,
   b. from about 50 to 900 milliliters of a sticking agent,
   c. from about 700 to 2,000 milliliters of octyl phenoxy polyethoxy ethanol, having 9 to 10 oxyethylene groups, and
   d. a particulate carrier.

2. The composition of claim 1 in which the carrier is vermiculite.

3. The composition of claim 1 containing from 900 to 1,500 milliliters of the octyl phenoxy polyethoxy ethanol.

4. The composition of claim 1 in which the combined amount of sticking agent and octyl phenoxy polyethoxy ethanol is from 1,400 to 1,800 milliliters.

5. The composition of claim 1 in which the sticking agent is a low aliphatic glycol having two to six carbon atoms.

6. The composition of claim 5 in which the lower aliphatic glycol is hexylene glycol.

7. The composition of claim 5 containing from 100 to 700 milliliters of the glycol.

8. The composition of claim 1 in which the carrier is present in an amount in excess of the amount of the triazine.

9. A fungicidal composition in granular form for the control of leafspot comprising a mixture of
   a. 1135 grams of 2,4-dichloro-6-o-chloroanilino-s-triazine,
   b. from about 600 to 800 milliliters of hexylene glycol,
   c. from about 800 to 1,000 milliliters of octyl phenoxy polyethoxy ethanol having 9–10 oxyethylene groups, and
   d. vermiculite in an amount ranging from about 6½ to 8½ times the amount of the triazine.

10. A fungicidal composition in granular form comprising a mixture of: (a) from 1100 to 1200 grams of 2,4-dichloro-6-o-chloroanilino-s-triazine, (b) from about 700 to 2000 milliliters of octyl phenoxy polyethoxy ethanol having 9 to 10 oxyethylene groups, and (c) a particulate carrier therefore.

11. A process of treating turf to control fungus disease therein comprising
applying to said turf a fungicidal mixture in granular form containing the following ingredients in the following amounts, based upon application to 10,000 sq. ft. of turf area:
   a. 1100 to 1200 grams of 2,4-dichloro-6-o-chloroanilino-s-triazine,
   b. from about 50 to 900 milliliters of a sticking agent,
   c. from about 700 to 2000 milliliters of octyl phenoxy polyethoxy ethanol, having 9 to 10 oxyethylene groups, and
   d. a particulate carrier.

12. The process of claim 11 in which the fungus disease is leafspot.

13. The process of claim 11 in which the carrier is vermiculite.

14. The process of claim 11 in which the sticking agent is hexylene glycol.

15. A process of treating turf to control fungus disease therein comprising applying to said turf a fungicidal mixture in granular form containing for each 10,000 sq. ft. of turf area: (a) from 1100 to 1200 grams of 2,4-dichloro-6o-chloroanilino-s-triazine, (b) from about 700 to 2000 milliliters of octyl phenoxy polyethoxy ethanol having 9 to 10 oxyethylene groups, and (c) a particulate carrier therefore.

* * * * *